(12) United States Patent
Chang et al.

(10) Patent No.: US 10,157,441 B2
(45) Date of Patent: Dec. 18, 2018

(54) HIERARCHICAL SYSTEM FOR DETECTING OBJECT WITH PARALLEL ARCHITECTURE AND HIERARCHICAL METHOD THEREOF

(71) Applicant: Automotive Research & Testing Center, Changhua County (TW)

(72) Inventors: Kuo-Ching Chang, Changhua County (TW); Chuan-Ren Li, Changhua County (TW); Zhen-Wei Zhu, Changhua County (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 0 days.

(21) Appl. No.: 15/391,144

(22) Filed: Dec. 27, 2016

(65) Prior Publication Data

US 2018/0181822 A1   Jun. 28, 2018

(51) Int. Cl.
*G06K 9/00* (2006.01)
*G06T 1/20* (2006.01)
(Continued)

(52) U.S. Cl.
CPC ............ *G06T 1/20* (2013.01); *G06K 9/00369* (2013.01); *G06K 9/00973* (2013.01);
(Continued)

(58) Field of Classification Search
None
See application file for complete search history.

(56) References Cited

U.S. PATENT DOCUMENTS

| | | | | |
|---|---|---|---|---|
| 7,853,072 B2* | 12/2010 | Han | .................... | G06K 9/4642 |
| | | | | 382/103 |
| 8,401,843 B2* | 3/2013 | Eksler | .................... | G10L 19/12 |
| | | | | 704/219 |

(Continued)

FOREIGN PATENT DOCUMENTS

| CN | 104680508 A | 6/2015 |
|---|---|---|
| CN | 105224951 A | 1/2016 |

(Continued)

*Primary Examiner* — Nancy Bitar
(74) *Attorney, Agent, or Firm* — Muncy, Geissler, Olds & Lowe, P.C.

(57) ABSTRACT

A hierarchical system for detecting an object with parallel architecture and a hierarchical method thereof is disclosed. The system includes at least one image-retrieving device retrieving at least an image and searching a plurality of obstacle position images in it. The image-retrieving device is electrically connected with an image-processing device to receive the obstacle position images transmitted by the image-retrieving device, uses parallel architecture classification to obtain at least one object image and a plurality of cropping frames thereof from the obstacle position images, synchronously separates the cropping frames to retrieve characteristic values of each cropping frame, uses convolutional neural network to simultaneously recognize the characteristic values of each cropping frame, and searches and outputs the correct cropping frame from the object image, thereby immediately detecting the object outside a vehicle and obtaining the cropping frame of the object to avoid detection error.

8 Claims, 5 Drawing Sheets

(51) Int. Cl.
    *G06T 7/70*           (2017.01)
    *G06K 9/46*           (2006.01)
    *G06K 9/62*           (2006.01)

(52) U.S. Cl.
    CPC .......... *G06K 9/4642* (2013.01); *G06K 9/628* (2013.01); *G06T 7/70* (2017.01); *G06T 2200/28* (2013.01); *G06T 2207/20081* (2013.01); *G06T 2207/30261* (2013.01)

(56) References Cited

U.S. PATENT DOCUMENTS

| | | | | |
|---|---|---|---|---|
| 8,649,604 | B2 * | 2/2014 | Steinberg | G06K 9/00228 |
| | | | | 382/118 |
| 8,718,362 | B2 * | 5/2014 | Tuzel | G06K 9/72 |
| | | | | 382/170 |
| 9,199,641 | B2 * | 12/2015 | Ferguson | G01C 21/3461 |
| 9,236,090 | B2 * | 1/2016 | Nobori | G11B 27/031 |
| 9,349,070 | B2 * | 5/2016 | Kasaoki | G06K 9/00805 |
| 2012/0134586 | A1 * | 5/2012 | Pajaniradja | G06K 9/00986 |
| | | | | 382/170 |
| 2014/0029852 | A1 * | 1/2014 | Pisipati | G06T 7/0042 |
| | | | | 382/182 |
| 2017/0206434 | A1 * | 7/2017 | Nariyambut Murali | ................ |
| | | | | G06K 9/628 |

FOREIGN PATENT DOCUMENTS

| | | |
|---|---|---|
| CN | 105354568 A | 2/2016 |
| TW | 201044008 A | 12/2010 |
| TW | 201447776 A | 12/2014 |

\* cited by examiner

HIERARCHICAL SYSTEM FOR DETECTING OBJECT WITH PARALLEL ARCHITECTURE AND HIERARCHICAL METHOD THEREOF

BACKGROUND OF THE INVENTION

Field of the Invention

The present invention relates to a system for detecting an object outside a vehicle and a method thereof, particularly to a hierarchical system for detecting an object with parallel architecture and a hierarchical method thereof.

Description of the Related Art

With the improvement of driving safety technology, more technologies for detecting obstacles outside a vehicle are invented, such as pedestrian detection, obstacle detection etc. The technologies can apply to detection devices to detect various environments, and the detection devices are combined with a collision avoidance system, whereby a user immediately avoids collision.

The present pedestrian detection or obstacle detection uses adaptive object classification with parallel architecture to apply to various road scenes, and classifies characteristics of obstacles outside a vehicle by using histogram of oriented gradient (HOG) and support vector machine (SVM), so as to immediately choose obstacle position images and cropping frames thereof from image data. However, the adaptive object classification sometimes makes misjudgments on cropping obstacles. For example, the cropping frames of obstacles are misjudged, so that the collision avoidance system can not immediately recognize them. Alternatively, distance estimation is misjudged. The misjudgment rate maybe not high, but users still concerns about the misjudgments on driving safety.

In addition, a conventional technology uses convolutional neural network (CNN) to extract features of a whole image outside a vehicle. Generally, the structure of CNN includes two layers one is a feature extraction layer, the input of each neuron is connected to the local receptive fields of the previous layer, and extracts the local feature. Once the local features are extracted, the positional relationship between it and other features also will be determined. The other is a feature map layer, and each computing layer of the network is composed of a plurality of feature map. Every feature map is a plane, the weight of the neurons in the plane are equal. Besides, since the neurons in the same mapping plane share weight, the number of free parameters of the network is reduced. Each convolutional layer in the convolutional neural network is followed by a computing layer which is used to calculate the local average and the second extraction, the two feature extraction structures reduce the resolution, thereby analyzing feature values of the inputted image outside the vehicle to determine the correctness of obstacles. Nevertheless, when the convolutional layer extracts the features of whole image outside the vehicle, a large operation amount is required. Thus, the first layer has to cost a lot of time extracting the features, and then the second layer determines them to output the correct technical features.

As a result, the conventional technology for analyzing obstacles outside the vehicle has estimation misjudgment on cropping frames. Alternatively, the conventional technology has to cost a lot of estimation time achieving precise determination rather than immediate determination. To overcome the abovementioned problems, the present invention provides a hierarchical system for detecting an object with parallel architecture and a hierarchical method thereof.

SUMMARY OF THE INVENTION

A primary objective of the present invention is to provide a hierarchical system for detecting an object with parallel architecture and a hierarchical method thereof, which uses a hierarchical analysis of parallel architecture classification and convolutional neural network to improve the efficiency of processing images and greatly decrease the time of processing images. Relatively, the response time of a collision avoidance system is increased, so that the rates of image misjudgment and failure are decreased.

Another objective of the present invention is to provide a hierarchical system for detecting an object with parallel architecture and a hierarchical method thereof, which applies to a collision avoidance system to warn a driver before collision, thereby avoiding rear-end collision accidents, head-on collision accidents and road-related accidents, achieving immediate determination and completely ensuring the safety of a vehicle, a driver and pedestrians.

To achieve the abovementioned objectives, the present invention provides a hierarchical method for detecting object with parallel architecture, which comprises: retrieving at least an image; searching a plurality of obstacle position images of the image; using parallel architecture classification to obtain at least one object image and a plurality of cropping frames thereof from the plurality of obstacle position images; synchronously separating the plurality of cropping frames and retrieving characteristic values of each cropping frame; and using convolutional neural network to simultaneously recognize the characteristic values of each cropping frame, and searching and outputting the correct cropping frame from the object image.

The present invention also provides a hierarchical system for detecting object with parallel architecture, which comprises: at least one image-retrieving device retrieving at least an image and searching a plurality of obstacle position images of the image; and an image-processing device electrically connected with the image-retrieving device, receiving the plurality of obstacle position images transmitted by the image-retrieving device, obtaining at least one object image and a plurality of cropping frames thereof from the plurality of obstacle position images, synchronously separating the plurality of cropping frames to retrieve characteristic values of each cropping frame, simultaneously recognizing the characteristic values of each cropping frame, and searching and outputting the correct cropping frame from the object image.

The plurality of obstacle position images of the image are searched in a sliding window way. An image calculator and an image algorithm are used to crop, calculate and classify characteristic data of the plurality of obstacle position images in a parallel way. Parallel classification is used to classify the characteristic data of the plurality of obstacle position images.

Besides, the present invention uses a convolutional way of a second layer of the convolutional neural network to synchronously separate the plurality of cropping frames and retrieve the characteristic values of each cropping frame, and uses a neural network of the second layer of the convolutional neural network to recognize the characteristic values of each cropping frame.

The step of using the parallel architecture classification to obtain the object image and the plurality of cropping frames thereof is performed by an image calculator. A complexity classifier is electrically connected with the image calculator, receives the object image and the plurality of cropping frames thereof transmitted by the image calculator, and uses the convolutional way of the second layer of convolutional neural network to perform the subsequent process.

Below, the embodiments are described in detail in cooperation with the drawings to make easily understood the technical contents, characteristics and accomplishments of the present invention.

DETAILED DESCRIPTION OF THE INVENTION

The present invention combines with an autonomous emergency braking system, applies to an image system for detecting obstacles of a vehicle, such as an autonomous driving assistant system (ADS) or a parking collision avoidance system (PCAS). A hierarchical system for detecting an object with parallel architecture and a hierarchical method thereof of the present invention can decrease calculation complexity and increase precision.

Figure 1:
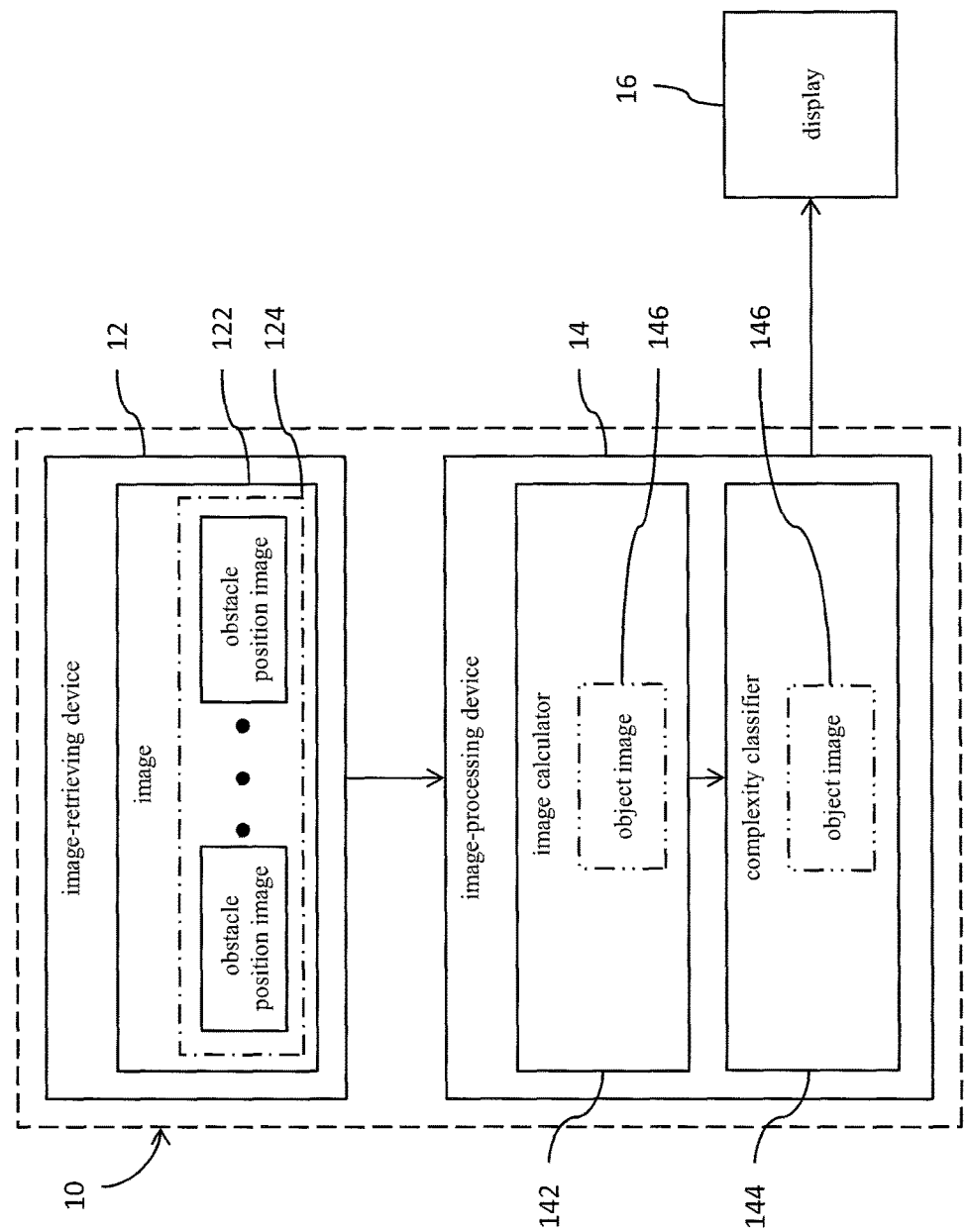
FIG. 1 is a block diagram schematically showing a hierarchical system for detecting an object with parallel architecture according to an embodiment of the present invention.
Figure 2:
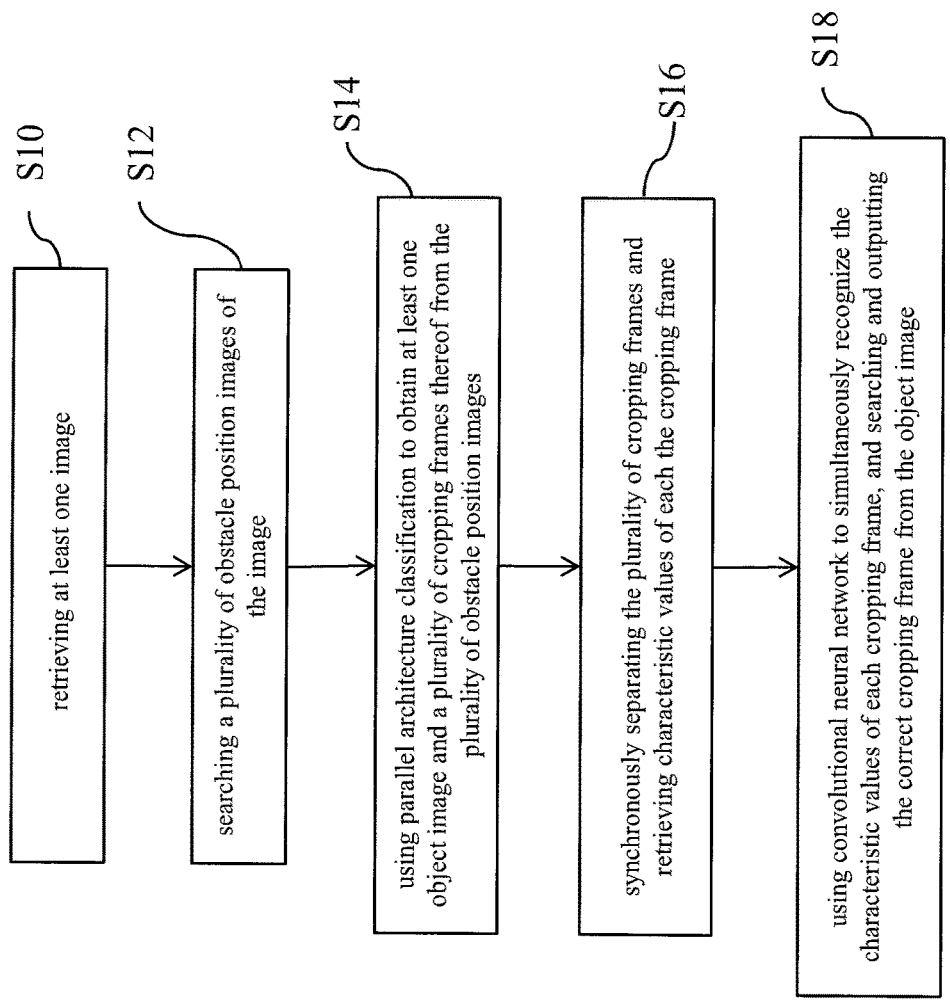
FIG. 2 is a flowchart of a hierarchical method for detecting an object with parallel architecture according to an embodiment of the present invention.

Refer to FIG. 1. A hierarchical system 10 for detecting object with parallel architecture comprises at least one image-retrieving device 12 and an image-processing device 14. The image-processing device 14 is electrically connected with the image-retrieving device 12 and a display 16. The embodiment exemplifies one image-retrieving device 12. The image-retrieving device 12 is a camera having a charge coupled device (CCD) and a digital signal processor (DSP). The image-processing device 14 further comprises an image calculator 142 and a complexity classifier 144. The image calculator 142 is electrically connected with the complexity classifier 144. The image-processing device 14 is a microcomputer on-board unit (OBU). The image calculator 142 can perform HOG and SVM. The complexity classifier 144 is a convolutional neural network classifier.

Continuing from the abovementioned description, the image-retrieving device 12 retrieves at least an image 122 from an environment outside a vehicle. The embodiment exemplifies an image 122. After retrieving the image 122, the image-retrieving device 12 searches a plurality of obstacle position images 124 of the image 122, and then transmits the plurality of obstacle position images 124 to the image-processing device 14, whereby the image-processing device 14 processes the plurality of obstacle position images 124. The image calculator 142 uses parallel architecture classification to obtain at least one object image 146 and a plurality of cropping frames cropping it. The embodiment exemplifies one object image 146. The image calculator 142 transmits the object image 146 and the plurality of cropping frames thereof to the complexity classifier 144. The complexity classifier 144 uses a convolutional way of a second layer of convolutional neural network to synchronously separate the plurality of cropping frames and retrieve characteristic values of each cropping frame. Then, the complexity classifier 144 of the image-processing device 14 recognizes the characteristic values of each cropping frame, and immediately searches the correct cropping frame from the object image 146. The image-processing device 14 outputs the correct object image 146 and the correct cropping frame thereof to the display 16 to display them.

Figure 3A:
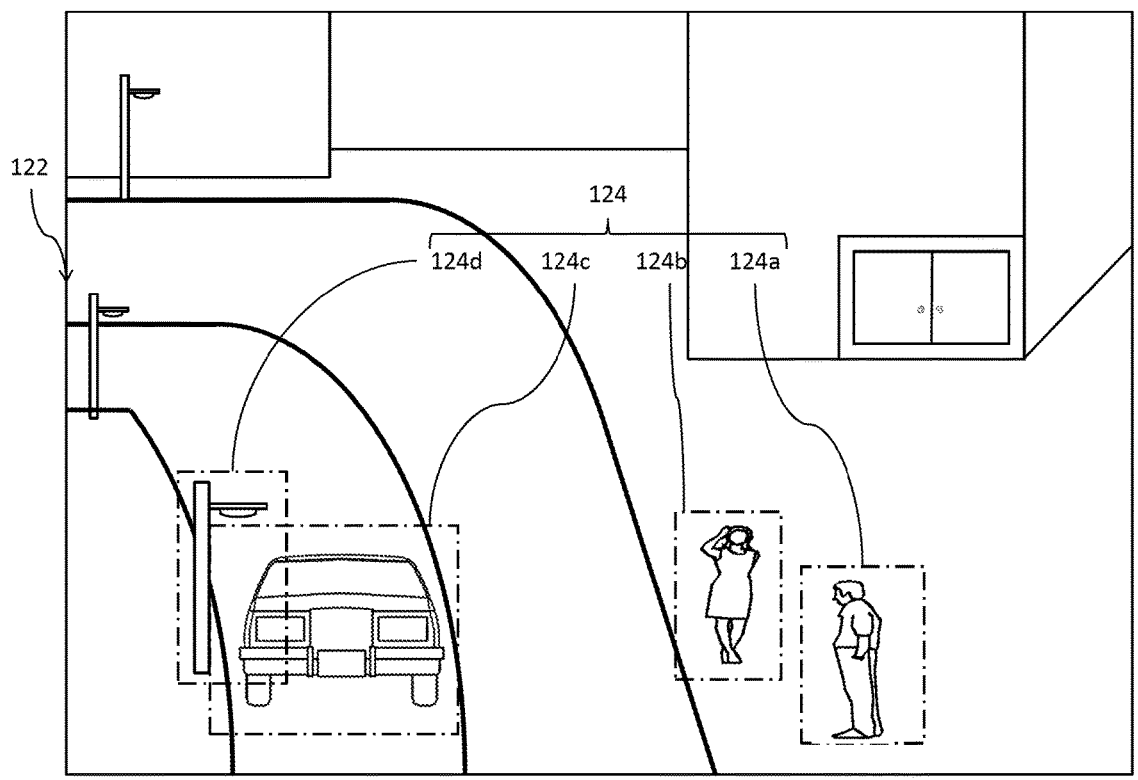
FIG. 3a is a diagram schematically showing an image of searching obstacle position images of an image according to an embodiment of the present invention.
Figure 3B:
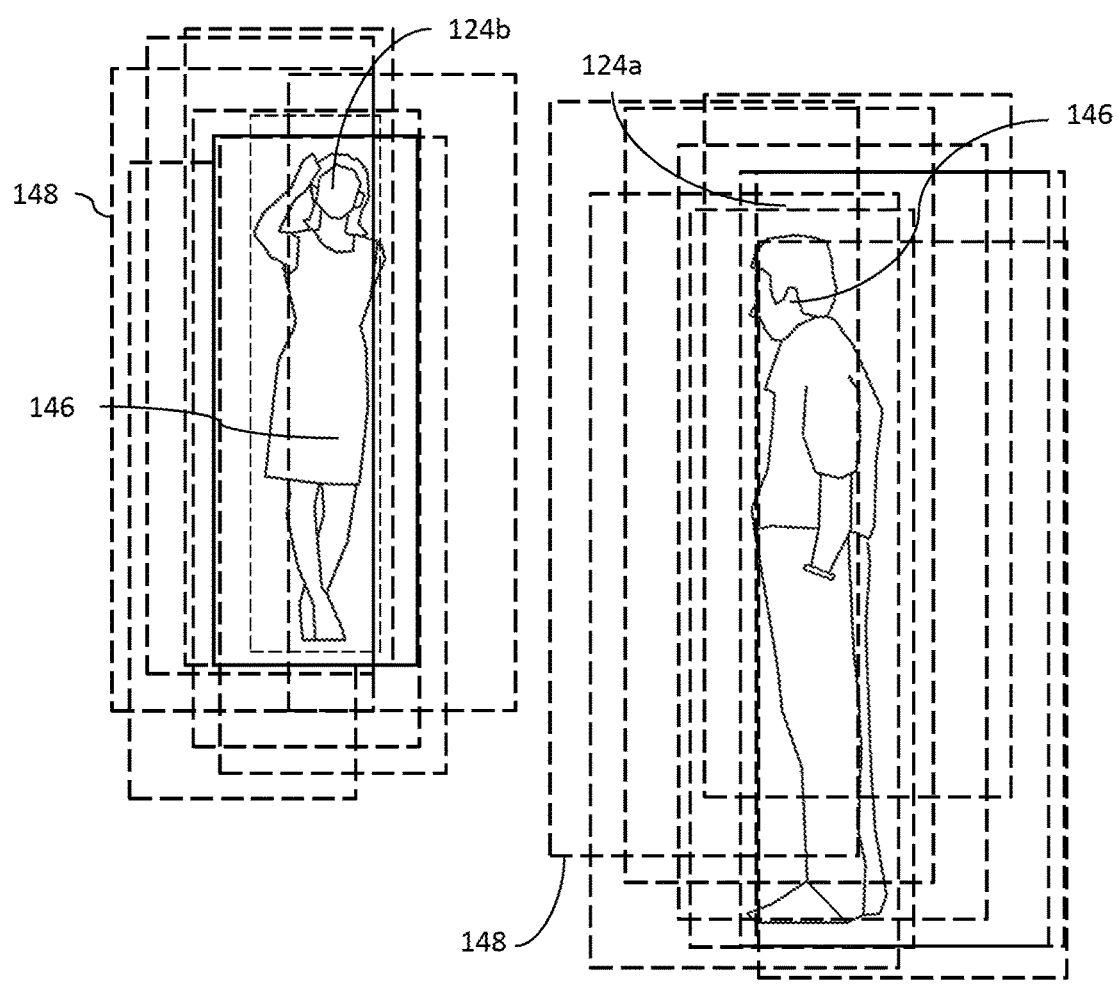
FIG. 3b is a diagram schematically showing an image of finding cropping frames of an object image according to an embodiment of the present invention.
Figure 3C:
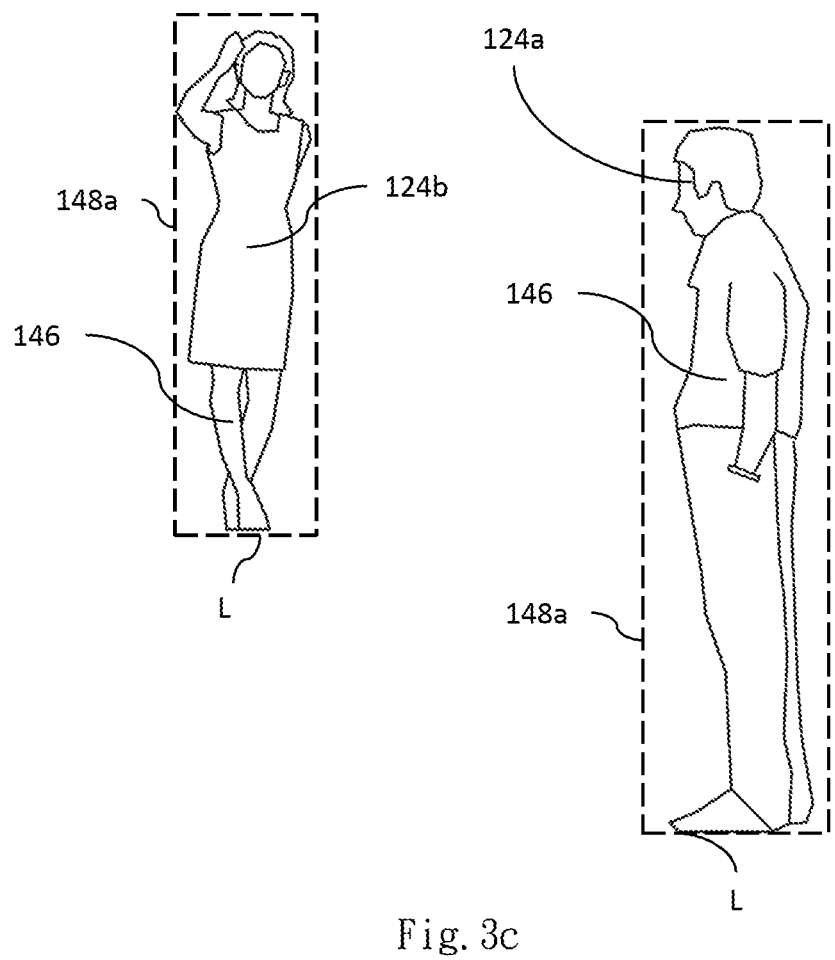
FIG. 3c is a diagram schematically showing an image of finding the correct cropping frames of the object image according to an embodiment of the present invention.

In order to further understand how to use the hierarchical method for detecting object with parallel architecture to achieve immediate detection and reduce the rate of detection failure, refer to FIG. 1, FIG. 2 and FIGS. 3a-3c. Firstly, in Step S10, the image-retrieving device 12 is used to retrieve at least an image 122. The embodiment exemplifies an image 122. Then, in Step S12, the image-retrieving device 12 recognizes a scene of the image 122, such as sunny day, rainy day or night. Then, according to different scenes, the image-retrieving device 12 searches a plurality of obstacle position images 124 from a region of interest (ROI) of the image 122 in a sliding window way, such as human body images 124a and 124b, a vehicle image 124c and a street lamp image 124d in FIG. 3a. The embodiment does not limit the scene or the ROI range of the image 122. The ROI mainly ranges over lower and central regions of a picture of the image 122 and is adjusted according to requirement of a user. In Step S14, the image-retrieving device 12 transmits the plurality of obstacle position images 124 to the image-processing device 14. The image calculator 142 uses an image algorithm to crop, calculate and classify the plurality of obstacle position images 124 in a parallel way, and uses parallel classification to classify characteristic data of the plurality of obstacle position images 124 into the at least one object image 146. After finding the object image 146, the object image 146 is surrounded by cropping frames 148, whereby the image-processing device 14 observes a specific position of the object image 146. Parallel architecture classification formed by the image algorithm and the parallel classification easily generates a plurality of cropping frames 148 to surround the object image 146 due to classification standard. In the embodiment, the image algorithm is HOG, and the parallel classification is SVM. The amount of the object image 146 is adaptable according to requirement of a user. The embodiment exemplifies pedestrians, and thus two object images 146 are found, namely the human body images 124a and 124b. Since the image algorithm and the parallel classification may cause an error, the plurality of cropping frames 148 are easily generated to surround the two object images 146 when cropping the two object images 146, as shown in FIG. 3b.

Then, refer to FIG. 1, FIG. 2 and FIGS. 3a-3c. Although the object image 146 and the plurality of cropping frames thereof 148 are obtained, the image-processing device 14 cannot know the correct cropping frame of the object image 146. The confused cropping frames will cause problems during recognition. Thus, the image calculator 142 transmits the object image 146 and the plurality of cropping frames to the complexity classifier 144. Then, in Step S16, the complexity classifier 144 uses a convolutional way of a second layer of convolutional neural network to split the plurality of cropping frames 148 surrounding the object image 146, thereby synchronously separating the plurality of cropping frames 148 and retrieving characteristic values of each cropping frame. In the embodiment, the second layer of convolutional neural network indicates the second stage of convolutional neural network, which is deep learning that can perform more complicated feature extract and feature map. The first layer of convolutional neural network indicates the first stage of convolutional neural network, which is shallow learning that can perform feature extract and feature map. The present invention uses the second layer to perform analysis of the second stage rather than the first layer. Then, in Step S18, the complexity classifier 144 uses a neural network of the second layer of the convolutional neural network to recognizes the characteristic values of each cropping frame 148. For example, a user programs to recognize pedestrians, and thus the complexity classifier 144 sets human body-related parameters, so as to use convolutional neural network to recognize the characteristic values retrieved by the convolutional way. In this step, the complexity classifier 144 recognizes the characteristic values of each cropping frame 148 of the two object images 146 such as the human body images 124*a* and 124*b*, so as to search the correct cropping frames 148*a*. The cropping frames 148*a* effectively choose the human body images 124*a* and 124*b*. The complexity classifier 144 can output the correct cropping frames 148*a* to the display 16. The display 16 can display the correct object images 146 and the cropping frames 148*a* to warn the user. From FIG. 3*c*, bottom lines L of the cropping frames 148*a* surrounding the object images 146 are clearly known. The bottom line L is used to calculate a distance between either of the human body images 124*a* or 124*b* and a vehicle driven by the user, establish an efficient collision avoidance system, and effectively dodge pedestrians in automatic driving lest an estimation error occur.

Compared with classification of convolutional neural network of a conventional technology, the hierarchical system for detecting object with parallel architecture and the hierarchical method thereof of the present invention can at least save four-fifths of recognition time. The classification of convolutional neural network of the conventional technology uses simple neural network of the first layer to determine the correctness of obstacle images. Then, the second layer is used to verify whether the results of the first layer are correct. However, when the classification of convolutional neural network of the conventional technology is used, the whole image characteristics have to be retrieved. Since the operation amount is quite large, it costs a lot of time retrieving the whole image characteristics. The present invention replaces analysis of the first layer with the parallel architecture classification, so as to save more time.

Continuing from the abovementioned paragraph, the present invention only occupies one-tenths of processing time of an obstacle recognition using HOG and parallel SVM. Compared with the obstacle recognition, the present invention greatly improves the precision of a cropping frame. For example, under a strict recognition condition, the conventional obstacle recognition may omit to crop a pedestrian to cause a serious error in recognizing the pedestrian. Alternatively, in order to avoid omitting to recognize the pedestrian, a recognition condition is relaxed. Under a loose recognition condition, the conventional obstacle recognition may generate too many cropping frames to surround the pedestrian, thereby causing an error in recognizing the pedestrian and problems with performing an autonomous driving assistant system or a collision avoidance system. For example, a practical distance between a vehicle and a pedestrian cannot be effectively calculated, so as to affect the safety of a driver and pedestrians. The hierarchical system for detecting object with parallel architecture and the hierarchical method thereof of the present invention not only decreases determination time but also achieves precise determination. Thus, an autonomous driving assistant system or a parking collision avoidance system can exactly control a vehicle to ensure safety of the driver and pedestrians.

However, pedestrians are recognized in the foregoing embodiment, but the present invention is not limited thereto. The user himself can decide to use convolutional neural network to recognize what kinds of obstacles and set parameters thereof, thereby using an autonomous driving assistant system or a collision avoidance system to set obstacles recognized. After the obstacle used as an object is found, convolutional neural network is used to determine the characteristic values of cropping frames surrounding the object, thereby finding the correct cropping frame. As a result, the autonomous driving assistant system or collision avoidance system can effectively control a distance between the vehicle and the obstacle, decrease recognition and increase response time of the user.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A hierarchical method for detecting object with parallel architecture comprising:
   Step (a): retrieving at least an image;
   Step (b): searching a plurality of obstacle position images of said at least an image;
   Step (c): using parallel architecture classification to obtain at least one object image and a plurality of cropping frames thereof from said plurality of obstacle position images;
   Step (d) synchronously separating said plurality of cropping frames and retrieving characteristic values of each said cropping frame; and
   Step (e): using convolutional neural network to simultaneously recognize said characteristic values of each said cropping frame, and searching and outputting correct said cropping frame from said at least one object image;
   wherein in said Step (d), a convolutional way of a second layer of said convolutional neural network is used to synchronously separate said plurality of cropping frames and retrieve said characteristic values of each said cropping frame;
   wherein in said Step (e), a neural network of a second layer of said convolutional neural network is used to recognize said characteristic values of each said cropping frame.

2. The hierarchical method for detecting object with parallel architecture according to claim 1, wherein in said Step (b), said plurality of obstacle position images of said at least an image are searched in a sliding window way.

3. The hierarchical method for detecting object with parallel architecture according to claim 1, wherein said Step (c) further comprises:
   using an image algorithm to crop, calculate and classify characteristic data of said plurality of obstacle position images in a parallel way; and
   using parallel classification to classify said characteristic data of said plurality of obstacle position images into said at least one object image and said plurality of cropping frames thereof.

4. The hierarchical method for detecting object with parallel architecture according to claim 3 wherein said image algorithm is HOG, and said parallel classification is SVM.

5. The hierarchical method for detecting object with parallel architecture according to claim 1, wherein said Step (b) further comprises:
recognizing a scene of said at least an image; and
searching said plurality of obstacle position images from a region of interest of said at least an image.

6. A hierarchical system for detecting object with parallel architecture comprising:
at least one image-retrieving device retrieving at least an image and searching a plurality of obstacle position images of said at least an image; and
an image-processing device electrically connected with said at least one image-retrieving device, receiving said plurality of obstacle position images transmitted by said at least one image-retrieving device, obtaining at least one object image and a plurality of cropping frames thereof from said plurality of obstacle position images, synchronously separating said plurality of cropping frames to retrieve characteristic values of each said cropping frame, simultaneously recognizing said characteristic values of each said cropping frame, and searching and outputting correct said cropping frame from said at least one object image;
wherein said at least one image-processing device further comprises:
an image calculator using parallel architecture classification to obtain said at least one object image and said plurality of cropping frames thereof; and
a complexity classifier electrically connected with said image calculator, receiving said at least one object image and said plurality of cropping frames thereof transmitted by said image calculator, using a convolutional way of a second layer of convolutional neural network to synchronously separate said plurality of cropping frames and retrieve said characteristic values of each said cropping frame, using a neural network of said second layer of said convolutional neural network to recognize said characteristic values of each said cropping frame, and searching and outputting said correct said cropping frame.

7. The hierarchical system for detecting object with parallel architecture according to claim 6, wherein said image calculator uses HOG and SVM to obtain said at least one object image and said plurality of cropping frames thereof.

8. The hierarchical system for detecting object with parallel architecture according to claim 6, wherein said complexity classifier is a convolutional neural network classifier.

* * * * *